Oct. 8, 1935.  G. R. KENNEDY  2,016,373
LUBRICATOR
Filed March 24, 1931  4 Sheets-Sheet 2

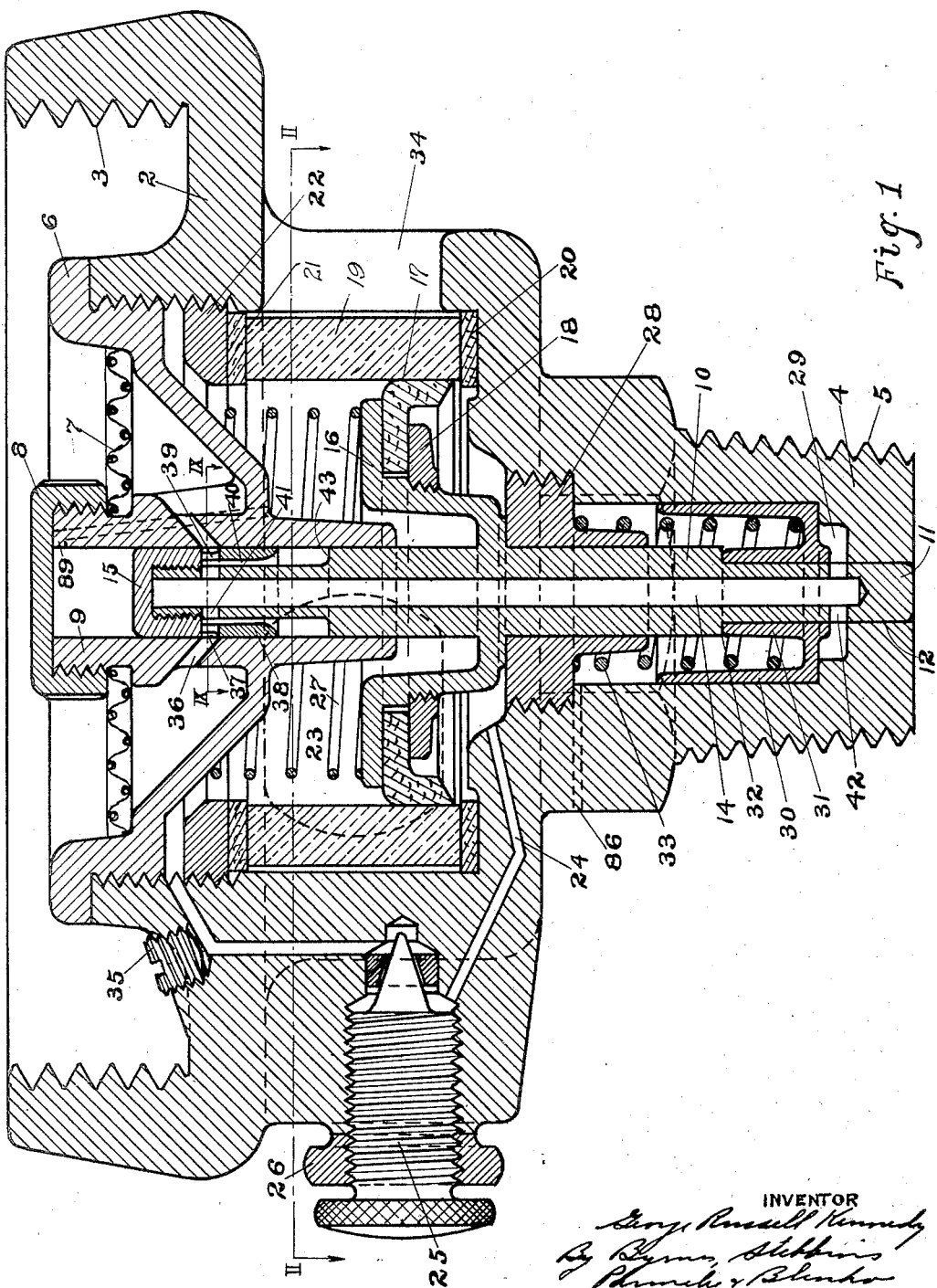

INVENTOR
George Russell Kennedy
By Byrnes, Stebbins,
Parmelee & Blenko
Attorneys Oct. 8, 1935.  G. R. KENNEDY  2,016,373
LUBRICATOR
Filed March 24, 1931  4 Sheets-Sheet 3
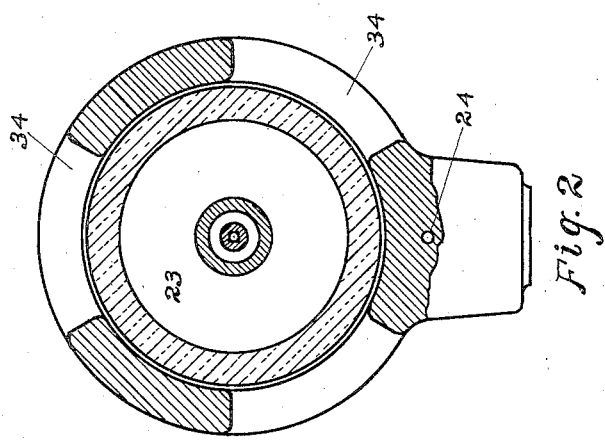
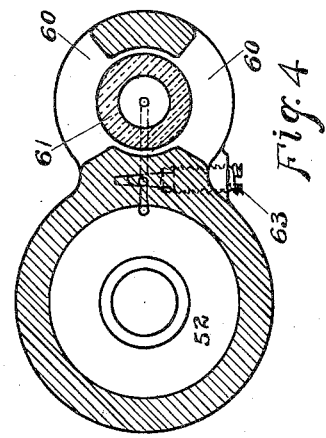
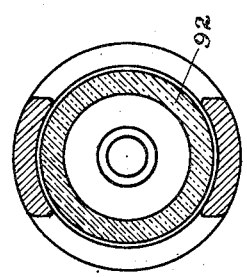
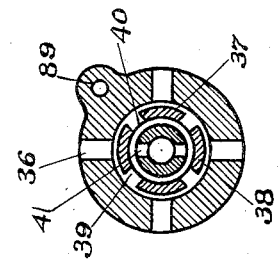
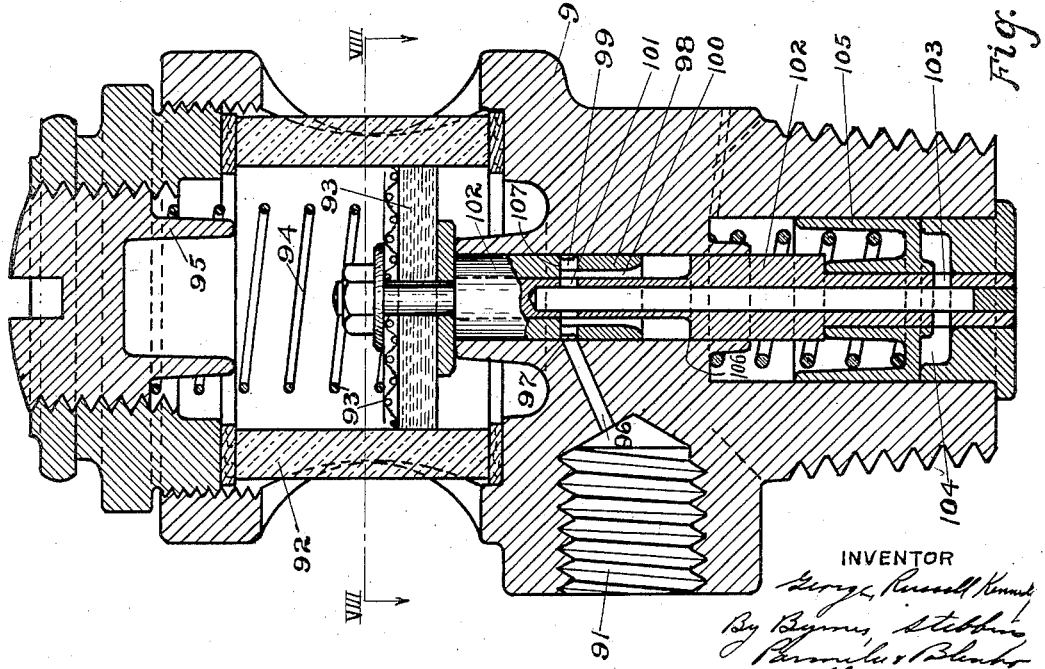

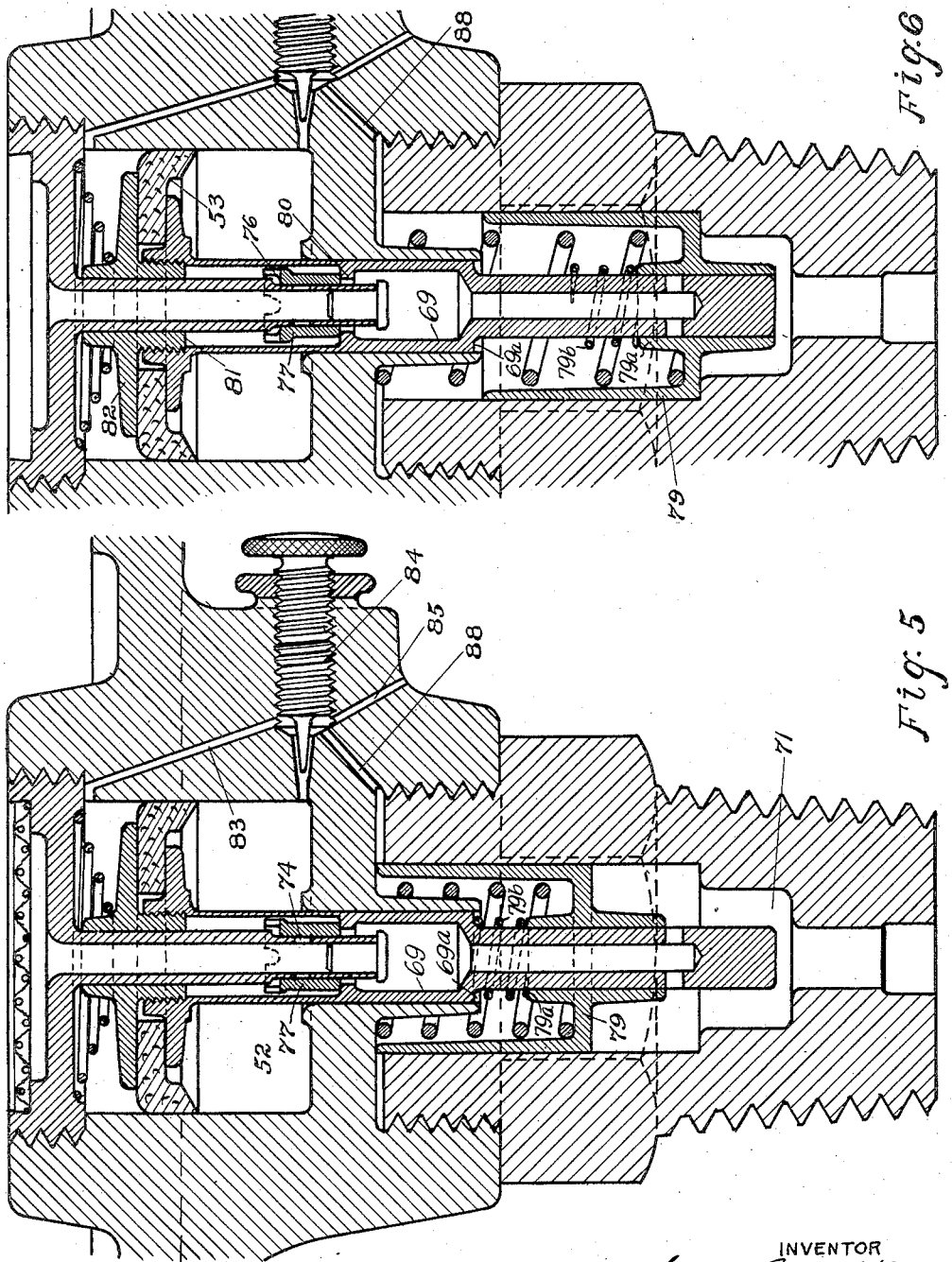

Patented Oct. 8, 1935

2,016,373

UNITED STATES PATENT OFFICE 2,016,373

LUBRICATOR

George Russell Kennedy, Pittsburgh, Pa.

Application March 24, 1931, Serial No. 524,787

16 Claims. (Cl. 184—42)

The present invention invention relates broadly to the art of lubricating, and more particularly to a lubricator and method of lubricating effective for utilizing so-called high-viscosity lubricants, such for example as greases, although the utility of the invention is not limited with respect to the lubricant being used.

It has heretofore been customary in the art to effect pressure lubrication by high viscosity lubricants, which will hereinafter be referred to as greases, by means of pressure guns and the like which are usually utilized when the mechanism being lubricated is at rest. Such an application of lubricant is objectionable for the reason that with rotating parts at rest, the rotating member always has a line or zone of maximum pressure on the bearing and a diametrically opposed line or zone of minimum pressure. During the lubricating operation, the lubricant will obviously flow to the point of least resistance, this being the zone of minimum pressure between the moving part and the bearing. The application of lubricant to this zone, to the exclusion of the other zone, does not effect uniformity of lubrication throughout the entire bearing.

The present invention has for one of its objects the provision of a lubricator effective for supplying lubricant under pressure with the parts being lubricated under normal conditions of operation.

Another object of the invention is to provide means for varying the rate of lubricant application. In accordance with the present invention the rate is controlled by means of a separate medium, hereinafter referred to as a controlling medium. This controlling medium is subject to regulation in such manner that the rapidity of operation of the lubricator may be varied to suit the conditions of operation of the mechanism being lubricated.

It is also desirable to provide lubricating means which are subject to visual inspection to determine the operating characteristics of the lubricator. The invention herein contemplated provides a lubricator of such construction that a casual inspection will indicate whether or not proper operation is being obtained. With ordinary lubricants, the viscosity of the lubricant varies under different temperatures. Such variations in viscosity have heretofore been sufficient to interfere with the desired operation of the lubricator. The present invention contemplates a lubricator which may be effectively utilized with any desired lubricant capable of flowing under pressure, regardless of the viscosity thereof, so long as such a pressure flow can be maintained.

In many cases it is further desirable to effect a different rate of lubrication at different points in a shop or on a given piece of apparatus. The present invention provides a lubricating unit which may be connected to a source of supply and individually regulated in such manner that each of the units fed from said source may deliver lubricant at the same or at different rates depending upon the individual adjustment.

In the accompanying drawings there are shown for purposes of illustration only, certain preferred embodiments of the present invention. In the drawings:

Figure 1 is a vertical sectional view through one type of unit constructed in accordance with the present invention;

Figure 2 is a transverse sectional view along the line II—II of Figure 1, looking in the direction of the arrows and upon a reduced scale, certain of the parts being omitted for sake of clearness;

Figure 4 is a view similar to Figure 2, but taken on the line IV—IV of Figure 3 and upon a reduced scale;

Figures 5 and 6 are partial sectional views through a lubricator of the type illustrated in Figure 3 for the purpose of explaining the operation of the lubricator;

Figure 7 is a view similar to Figures 1 and 3 illustrating another embodiment of the invention;

Figure 8 is a transverse sectional view on the line VIII—VIII of Figure 7, looking in the direction of the arrows, certain of the parts being omitted and upon a reduced scale; and Figure 9 is a detail sectional view on the line IX—IX of Figure 1, looking in the direction of the arrows, the section, however, being generally applicable to the lubricators of Figures 3 and 7.

Figure 3:
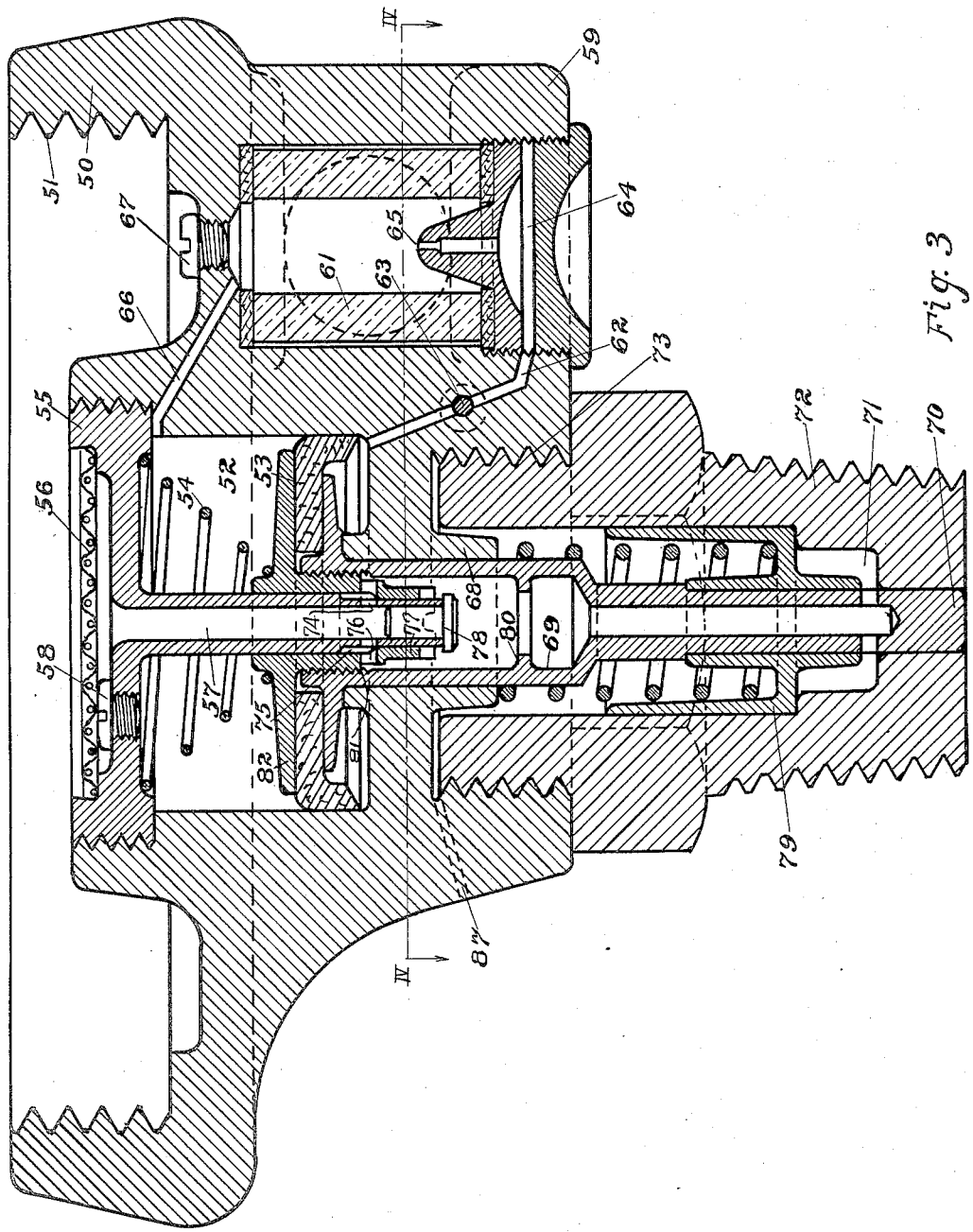
Figure 3 is a view similar to Figure 1, illustrating another embodiment of the invention.

The lubricators illustrated more particularly in Figures 1 and 3 of the drawings are of the type adapted to be applied directly as an adjunct to the base of a standard lubricating cup or the like, while the lubricator of Figure 7 constitutes a unit of such characteristics that it may be directly connected, as one of the series, to a suitable supply line of lubricant under pressure. With the forms of Figures 1 and 3 it will likewise be understood that the lubricant supply to the cups may be from a central source under a suitable pressure dependent upon the pressure at which lubrication is to be effected.

Referring more particularly to Figures 1 and 2, the lubricator is illustrated as comprising a base 2 internally threaded as illustrated at 3 to permit application in the manner referred to. Carried by the base is an extension 4 having an externally threaded portion 5 adapted to be threaded into the part to be lubricated. The entire base casting is of generally hollow or cored out construction, as will be hereinafter more fully apparent, for the purpose of receiving the lubricator parts or affording the desired control.

Suitably threaded into the base is a cap 6 carrying a screen 7 suitably retained in position by a cap cover and screen lock 8. This screen lock is threaded onto the upper end of an extension 9 carried by the cap, and forming a stem guide. The screen 7 is for the purpose of effecting a partial straining of the lubricant delivered to the lubricator, for the purpose of removing any solid particles therefrom.

Carried by the stem guide 9 is a stem 10 terminating in a plug valve portion 11 adapted to normally close a lubricant outlet 12 in the lubricator. The stem is formed with a central longitudinally extending duct 14 closed at its upper end by a stem cap 15. Intermediate its ends, the stem carries a cup washer 16 with which cooperates a cup leather 17, the cup leather being retained in place by a clamping nut 18. This cup leather is of such dimensions as to cooperate with an auxiliary cylinder 19, preferably of glass, sealed at its lower end against a suitable packing 20 and at its upper end against a similar packing 21, the cylinder and packings being held in assembled relationship by a nut 22. The cylinder 19 provides an auxiliary or control reservoir 23 having its upper and lower ends interconnected through the medium of a passageway 24 within which is located a control valve 25 adapted to be held in adjusted position by means of a lock nut 26. This passageway constitutes a by-pass control port for the operation of the lubricator, and will be hereinafter more fully referred to. Located within the control cylinder 23 is an auxiliary spring 27 effective for normally urging the cup washer 16 downwardly into the position illustrated in Figure 1.

Carried by the body below the control cylinder, is a gland nut 28 serving as a guide for the stem 10, and also providing therebelow a lubricant reservoir 29. Working within the lubricant reservoir is a plunger 30 having a hub portion 31 carried by the reduced lower end of the stem 10, and bearing against a shoulder 32. Intermediate the gland nut 28 and the plunger 30 is a pressure spring 33 of such characteristics as to be compressible under the pressure to which the lubricant is delivered.

It will be apparent from Figures 1 and 2 that the base 2 is formed with a suitable number of windows 34 through which the conditions within the control cylinder 23 may be observed.

In preparing the lubricator for operation, a filling plug 35 is removed, and the control cylinder 23 and the control duct 24 substantially filled with a controlling medium of fluid characteristics. This medium may comprise a compressible fluid such as air, or an incompressible fluid such as oil, mercury or the like.

The desired control medium having been supplied, the filling plug 35 is replaced and the base 2 connected to the desired source of lubricant under suitable pressure as aforesaid. This pressure is sufficient for forcing the lubricant through the screen 7 and downwardly through supply ducts 36 into an annular chamber 37 surrounding a sleeve valve 38. This lubricant passes radially through the cap, by way of ports 39 into an inner annular chamber 40. This chamber in turn communicates with the central duct 14 in the valve stem through radially extending stem ports 41 of which any desired number may be provided. The lubricant thus supplied passes downwardly through the stem into the plunger reservoir 29 by way of radial outlet ports 42. As before stated, the pressure of the lubricant is sufficient to overcome the spring 33, thus gradually raising the plunger 30 and compressing the spring 33.

The upward movement of the plunger 30 is transmitted to the valve stem 10 through the shoulder 32, thus gradually raising the stem. During this raising movement, the stem slides through the gland nut 28 and moves relatively to the sleeve valve 38. During such upward movement, a portion of the control medium within the control cylinder 23 is permitted to slip past the cup leather 17 into the space below the same. As the upward movement continues, the upper edge of the plunger 30 comes into contact with the bottom of the gland nut 28. Prior to this time, however, a shoulder 43 on the stem 10 comes into engagement with the lower edge of the sleeve valve 38 and slides it upwardly, thus closing the supply ducts 36. At this time, the source of lubricant will be cut off from communication with the plunger reservoir 29. The upward movement of the stem, however, is likewise effective for moving the plug valve 11 out of the orifice 12, so as to permit the contents of the plunger reservoir to be discharged for lubricating purposes. With this port open, the spring 33 tends to expand and expel the lubricant by moving the plunger downwardly.

In like manner, the spring 27 also tends to expand and lower the control piston within the control cylinder 23. The rapidity of downward movement of the control piston is, however, regulated by the setting of the valve 25. With a close setting of this valve, a relatively slow escapement or bypass flow through the port 24 is permitted, while with a wider opening of the valve a relatively faster flow takes place. By thus adjusting the rate of flow, the rapidity of the downward movement of the control piston may be regulated so as to require any desired time interval. Near the completion of its downward movement, the stem cap 15 engages the sleeve valve 38 and again lowers it, thus uncovering the supply ducts 36 and permitting the unit to repeat its cycle of operation.

By utilizing a sufficient pressure on the lubricant at the source of supply, it will be apparent that the operation of the unit is made independent of the viscosity of the lubricant itself. By observing the movement of the control piston through the windows 34, the rapidity of operation of the unit may be readily determined.

In Figures 3 and 4 there is illustrated a slightly modified embodiment of the invention, the operation of which is shown during different stages in Figures 5 and 6. As with the lubricator of Figures 1 and 2, this unit comprises a base 50 having internal threads 51 for attachment to the source of supply. Formed within the base is a control cylinder 52 within which operates a control piston 53 normally urged downwardly by a spring 54 bearing at its lower end against the control piston and at its upper end against a cap 55. This cap is herein shown as provided with a screen 56 for straining the lubricant prior to its passage into the hollow cap extension 57. The cap also carries a filling plug 58 adapted to be removed to permit the control cylinder 52 to be filled with the desired control medium.

The base 50 is formed with a lateral extension 59 provided with windows 60, illustrated more particularly in Figure 4, adapted to afford visual observance of conditions within a transparent cylinder 61. Leading from the control cylinder adjacent the lower end thereof is a passageway 62 the flow through which is adapted to be controlled by a valve 63, corresponding generally to the valve 25 before described. The passageway 62 communicates with a chamber 64 from which it is permitted to escape into the interior of the cylinder 61 through an orifice 65. The upper end of the cylinder 61 and the upper end of the control cylinder 52 are interconnected by means of a passageway 66. In accordance with this embodiment of the invention it may be desirable to fill the control cylinder 52 with a control medium such as oil. In such case, the cylinder 61 may be filled, through a suitable filling plug 67, with a different medium such as water having a greater specific gravity than the oil. In such case, the downward movement of the control piston will cause the oil to pass through the orifice 65 and thence into the body of water through which it will flow to the upper surface and pass by way of the passageway 66 to the space above the control piston. On the upper stroke of the control piston, the oil thereabove will be permitted to travel directly past the edges of the cup leather of the control piston assembly. Such a construction affords a visual means of readily determining the rapidity of movement of the control piston.

The base 50 is further provided with an inwardly extending guide portion 68 for a hollow stem 69 projecting downwardly from the control piston and terminating in a plug valve 70 similar to the valve 11 of Figure 1 to permit assembly of the parts, the plunger reservoir 71 is formed in a separate extension 72 having a threaded connection 73 with the base 50.

Lubricant supplied through the screen 56 passes downwardly through the hollow extension 57 to outlet ports 74 communicating with an annular chamber 75 which in turn discharges through ports 76 in a sleeve valve 77 carried by the hollow extension 57. The lower end of this extension is closed by a plug 78 forming a projecting shoulder underlying the lower end of the sleeve valve 77. From the ports 76 the lubricant passes downwardly through the stem 69 into the reservoir 71, thus raising a plunger 79 therein in the manner before described.

During this upward movement, a shoulder 80 on the stem 69 engages the lower end of the valve 77, as illustrated in Figure 5 and moves it upwardly, thereby closing the ports 74 and preventing a further flow of lubricant to the plunger reservoir 71. Under these conditions, the plunger 79 moves downwardly into the position illustrated in Figure 6, thus ejecting lubricant from the plunger reservoir to the part to be lubricated. Thereafter the control piston 53 gradually moves downwardly, thus carrying the shoulder 80 out of supporting engagement with the sleeve valve 77 and leaving it free to be moved downwardly when engaged by the bottom surface 81 of a washer 82 constituting part of the control piston. This downward movement will serve to bring the ports 76 therein into alinement with the ports 74 in the extension 57 whereby the cycle of operation may be repeated.

While Figures 5 and 6 are effective for illustrating the operation of the structure of Figure 3, the lubricator structure is slightly different in other respects from the construction of Figure 3 as to the regulation of the controlling medium. In these figures the upper and lower ends of the control cylinder 52 are shown as directly connected through a passageway 83 in which is positioned a control valve 84. With this arrangement, air may be utilized as the controlling medium. On the downward movement of the control piston the air will pass the valve 84 and flow upwardly into the space above the piston. On the upper stroke, if additional air is needed, it may be supplied through an air vent 85 constantly open to the atmosphere.

In all cases the space above the lubricant plunger is provided with a suitable vent. In the form of Figure 1, there is illustrated a vent 86 leading directly to the atmosphere, a similar vent 87 being shown in Figure 3. In Figures 5 and 6 this venting is accomplished by a passageway 88 communicating with the vent 85. In like manner the control cylinder itself may be vented, a suitable vent 89 for this purpose being shown in Figure 1.

It will be observed that an auxiliary compression spring 79$^b$ is provided around the hollow stem 69 and confined between the hub portion 79$^a$ of the plunger 79 and shoulder 69$^a$ on the hollow stem 69. The purpose of this spring is to rapidly transmit motion from the plunger 79 to the hollow stem 69. In the operation of the device, the spring is gradually compressed as the plunger is moved upwardly to exert a pressure near the end of the upstroke of the plunger sufficient to insure the lifting of the valve stem to a position where the valve 77 is fully closed and the discharge passage at the bottom of reservoir 71 is opened. The spring 79$^b$ causes the rapid motion of piston 53 during its upward stroke, because of the fact that the static resistance to movement of piston 53 is greater than the sliding resistance offered after the movement thereof is started. Consequently, the spring will be compressed before the piston starts to move to a greater degree than is necessary to overcome the sliding friction of the piston, so that once the piston movement is started the extra force in the compressed spring in excess of that required to barely overcome the sliding friction of the moving piston will be exerted to move piston 53 and associated valve 77 more rapidly than if the piston were operated by the comparatively steady action thereon of plunger 79. While I have shown this spring arrangement in Figures 5 and 6 only, it may also be used, if desired, in the other structures illustrated.

It will be thus seen that the spring 79$^b$ serves to quickly and positively move the plunger 69 at the time during the cycle of operation and thus to rapidly close the valve 77 and to insure that the valve will not stop in a neutral position such that the lubricant would pass directly through the apparatus.

In Figure 7 there is illustrated another embodiment of the invention adapted to be connected directly to a supply line in which lubricant is furnished under the desired pressure. This embodiment comprises a main body casting 90, having a lubricant inlet 91. Within the upper portion of the body casting provision is made for a transparent cylinder 92 within which works a control piston 93. The control piston is herein illustrated as comprising a porous plunger through which the control medium passes in one direction upon a controlling or timing movement of the piston. The piston is normally urged downwardly by a spring 94 the degree of compression of which may be adjusted by a suitable nut 95. This control piston is backed on one side by a reticulated washer 93'.

Lubricant supplied through the connection 91 passes by way of a port 96 into an annular chamber 97 surrounding a sleeve valve 98. This sleeve valve is in turn provided with inlet ports 99 communicating with an annular chamber 100 within the valve. This chamber passes the lubricant by way of ports 101 into the interior of a hollow stem 102. Lubricant passing downwardly through the stem is discharged by way of ports 103 into a plunger reservoir 104 beneath a plunger 105 similar to the plungers heretofore described. This lubricant raises the plunger, thereby bringing a shoulder 106 on the stem 102 into engagement with the lower edge of the sleeve valve 98, thus raising this valve and closing the port 96 and cutting off further inflow of lubricant.

During the upward movement of the stem 102, the control piston 93 buckles or bends downwardly away from the washer 93'. This allows the controlling medium within the control cylinder 92 to pass freely around the control piston. Thereafter, upon ejection of the lubricant by the plunger 105, the expansion of the spring 94 gradually lowers the control piston, thus restoring it to substantially flat condition against washer 93', and compelling the controlling medium to actually pass through the porous piston. Near the limit of its downward movement a shoulder 107 engages the upper end of the sleeve valve 98 and moves it downwardly, thus reestablishing communication between the ports 96 and 99 and permitting a second cycle to take place.

To those skilled in the art, it will be apparent that sleeve valves such as the sleeve valve 38 shown in Figure 1, the sleeve valve 77 shown in Figure 3 and the sleeve valve 98 shown in Figure 7 are so closely fitted that they will not move due to the action of gravity, but only when there is some direct force exerted thereon either to raise or lower the same. Due to this construction, the sleeve valves when positively moved to their upper position remain in such position until pressure is applied thereto to lower the same, and after the lowering operation has been completed they remain in lowered position until again positively raised.

From the foregoing description, it will be apparent that I have provided a lubricator effective for supplying a lubricant under pressure, regardless of the viscosity of such lubricant so long as it possesses flow characteristics under the pressure conditions obtaining within the system. The rapidity of the lubricating cycles is regulated by a control medium other than the lubricant itself, and subject to observation through a transparent body provided for that purpose. In each case, the rapidity of the lubricating cycles is subject to accurate and instant control at the will of the operator. With the form of Figure 7, such a control is obtainable by adjusting the pressure of the spring 94 by means of screw 95.

The lubricators lend themselves to use under a variety of different conditions, and are useful as individual units or as a series of units operating at the same or different cycle intervals.

In all cases the control reservoir or cylinder will preferably be of considerable size relative to the plunger reservoir, in order to afford a sufficient body of control medium to absolutely insure possibility of effecting the desired operation.

The term "plunger" as utilized herein, and likewise the term "plunger reservoir", are both used generically as terms of explanation and include within their scope movable bodies such as pistons, plungers, diaphragms or the like effective for producing an operation of the character contemplated.

While I have herein illustrated and described certain preferred embodiments of the present invention, it will be understood that changes in the construction and arrangement of the parts may be made without departing either from the spirit of the present invention or the scope of my broader claims.

I claim:

1. In a lubricator, a plunger reservoir, a plunger therein, means through which lubricant under pressure may be supplied to said reservoir in measured quantities, said reservoir having a normally closed discharge outlet, means controlled by said lubricant under pressure for opening said outlet, a control cylinder, and a control piston movable within said cylinder for controlling the speed of operation of the lubricator.

2. In a lubricator, a body including a stem, a control piston secured to said stem, a control cylinder within which said piston is operative, a lubricant plunger surrounding said stem and slidable thereon, a plunger reservoir within which said plunger is operative, means through which lubricant may be supplied to said plunger reservoir under pressure, and a control valve for said lubricant actuated by movement of said stem, said valve being of the sleeve type and surrounding said stem.

3. In a lubricator, a control cylinder, a control piston therein, said parts being constructed to permit the movement of a controlling medium from one side of said piston to the other at controlled rates during movement of said piston, a stem connected to said piston, a lubricant reservoir through which said stem projects, said reservoir having an outlet normally closed by said stem, lubricant ejecting means in said reservoir operatively connected to said stem, means through which lubricant may be supplied to said reservoir for displacing said ejecting means and operating said stem to open said outlet, and a lubricant control valve cooperating with said stem.

4. In a lubricator, a plurality of chambers constituting a control chamber and a measuring chamber respectively, control means in said control chamber and ejecting means in said measuring chamber, said measuring chamber having an outlet, means controlled by said control means in one position for closing said outlet, and means in said ejecting chamber for opening said outlet and discharging the measured lubricant therein through said opening.

5. In a lubricator, a plurality of chambers constituting a control chamber and a measuring chamber respectively, control means in said control chamber and ejecting means in said measuring chamber, said measuring chamber having an outlet, means controlled by said control means in one position for closing said outlet, and means in said ejecting chamber for opening said outlet and discharging the measured lubricant therein through said opening, said last mentioned means comprising a spring pressed ejecting plunger.

6. In a lubricator, a lubricant reservoir, means through which lubricant may be supplied to said reservoir under pressure, discharge means in said reservoir, said reservoir having a normally closed discharge outlet, means movable in response to said lubricant under pressure for cutting off the supply of lubricant to said reservoir for opening said outlet and for controlling the ejection of lubricant through said discharge outlet when opened, and control means cooperating with said reservoir for regulating the frequency of filling and discharging said reservoir.

7. In a lubricator, a lubricant reservoir, means through which lubricant may be supplied to said reservoir under pressure, a movable discharge means in said reservoir, said reservoir having a normally closed discharge outlet, spring responsive means movable in response to said lubricant under pressure for cutting off the supply of lubricant to said reservoir for opening said outlet and for controlling the ejection of lubricant through said discharge outlet when opened, and control means cooperating with said reservoir for regulating the frequency of filling thereof, said control means including a cylinder having a controlling medium therein and a control piston moving within said cylinder.

8. In a lubricator, a lubricant reservoir, a movable discharge means in said reservoir, said reservoir having a normally closed discharge outlet, means for opening and closing the discharge outlet, spring responsive means controlling the ejection of lubricant through said discharge outlet when opened, and control means cooperating with said reservoir for regulating the frequency of filling thereof and opening of said outlet, said control means including a cylinder having a controlling medium therein and a control piston movable within said medium, said lubricator being constructed to permit visual observation of the rapidity of movement of said control piston.

9. In a lubricator, a lubricant reservoir having a discharge outlet, means for opening and closing the discharge outlet, lubricant ejecting means in said reservoir, means through which lubricant may be supplied under pressure to said reservoir and displacing said ejecting means, and speed control means operatively connected to said ejecting means and to the means for opening and closing the discharge outlet, said speed control means comprising a control piston and a control cylinder within which said piston is periodically operable at a controlled rate.

10. In a lubricator, a lubricant reservoir having a discharge outlet, means for opening and closing the discharge outlet, lubricating ejecting means in said reservoir, means through which lubricant may be supplied under pressure to said reservoir and displacing said ejecting means, and speed control means operatively connected to said ejecting means and to the means for opening and closing the discharge outlet, said speed control means comprising a control piston and a control cylinder within which said piston is periodically operable at a controlled rate, said control cylinder being constructed to permit visual observation of the rapidity of movement of said control piston.

11. In a lubricator, a body including a stem, a control piston secured to said stem, a control cylinder within which said piston is operative, a lubricant plunger surrounding said stem and sliding thereon, a plunger reservoir within which said plunger is operative, means through which lubricant may be supplied to said plunger reservoir under pressure, a control valve for said lubricant, means on the stem for actuating the valve upon predetermined movement of said stem, said reservoir having an outlet, and means on said stem for closing said outlet while lubricant is being supplied to said reservoir.

12. In a lubricator, a control chamber having a piston therein, a stem extending beyond said piston, a lubricant reservoir having a discharge outlet normally closed by said stem, means for supplying lubricant to said reservoir and raising said stem to open said outlet, and means for ejecting the lubricant from said reservoir through said opened outlet.

13. In a lubricator, a control cylinder, a control piston therein, means normally urging said piston in one direction, means for adjusting the speed of operation of said control piston, a lubricant plunger cooperatively connected with said piston and effective for moving said piston in the opposite direction, means through which lubricant may be supplied under pressure for moving said lubricant plunger and piston in such opposite direction, a control valve operatively connected to said plunger for controlling the supply of said lubricant, a lubricant discharge valve, and means operatively connected to said control piston for opening and closing said discharge valve.

14. In a lubricator, a lubricant reservoir, a plunger therein, a conduit through which the lubricant may be supplied to said reservoir under pressure, a valve in said conduit whereby the flow of lubricant through said conduit may be controlled, means cooperating with said plunger for operating the valve, and means cooperating with said plunger for regulating the frequency of filling and discharging of said reservoir.

15. In a lubricator, a lubricant reservoir, a plunger therein, means through which lubricant under pressure may be supplied to the reservoir, means operatively connected to the plunger for intermittently cutting off the supply of said lubricant, and means cooperating with said plunger for regulating the frequency of filling and discharging of said reservoir.

16. In a lubricator, a body including a stem, a control piston secured to said stem, a control cylinder within which said piston is operative, a lubricant plunger sliding on said stem, a plunger reservoir within which said plunger is operative, means through which lubricant may be supplied to said plunger reservoir under pressure, and a sleeve-type control valve surrounding said stem, and spring means between the lubricant plunger and said valve actuated by movement of said plunger for rapidly closing said valve.

GEORGE RUSSELL KENNEDY.